Patented Feb. 15, 1938

2,108,340

UNITED STATES PATENT OFFICE 2,108,340

DESACETYL-PSEUDO BUFOTALIN HALOID AND METHOD OF PREPARING SAME

Heizaburo Kondo, Shibuya-ku, Tokyo, Shunichi Ikawa, Hongo-ku, Tokyo, and Yoshito Kobayashi, Azabu-ku, Tokyo, Japan No Drawing. Original application August 22, 1934, Serial No. 740,872, now Patent No. 2,062,667. Divided and this application November 3, 1936, Serial No. 108,974

2 Claims. (Cl. 260—25)

The present invention relates to desacetyl-pseudo-bufotalin haloid and method of preparing the same, which consist in removing a petroleum ether-soluble substance and a resinous matter insoluble in ether alcohol from the liquor extracted from the Chinese medicine "Sénso", which is the commercial name given to a dried product obtained from the venom secretion of the Chinese toad. The poisonous secretion is a milky liquid the viscosity of which increases with the lapse of time, and for medicinal purposes it is formed into many shapes, mostly a round rice cracker shape and dried. The resulting product, known commercially as "Sénso", is used in the treatment of cardiotonica, and in stimulantia and local-anesthesia, etc. The liquor extracted as above stated, is then de-acetylized, and saponified by adding alkali and is thus converted into a haloid compound. The object thereof is to prepare a heart medicine which has an excellent medical effect by saponifying and thus deacetylizing pseudo-bufotalin which is the effective ingredient of "Sénso" and then synthetizing a new compound, the haloid derivative thus produced.

Now, bufotalin is the term given by E. St. Faust of Germany in the year 1902 to the secretion of the toad (Bufo vulgaris sehl.) found in Europe which is a non-crystalline effective ingredient resembling digitalin in pharmacological action. Subsequently, in 1922 it was ascertained by H. Wieland and his collaborator (B. 55, 1789) that its constitution is $C_{26}H_{36}O_6$ with the melting point of 145–146° C. Also, a Japanese named Nunio Kotake has reported that he had succeeded in separating said bufotalin from the secretion of the Japanese toad (Bufo vulgaris formosus). However, their yields are very trifling, and as there has been found no other material from which to obtain bufotalin, it has hitherto been impossible to make bufotalin effective as a practical medicine.

Pseudo-bufotalin according to the present invention has the same composition, namely $C_{26}H_{36}O_6$, as bufotalin and shows the melting point of 145–146° C., but on account of its different chemical property is called pseudo-bufotalin. This invention has solved simply the problem of preparing a heart medicine largely consisting of the above product converted into a haloid compound by deacetylization. That is to say, in this invention the handy Chinese medicine, "Sénso" is employed as the raw material. The liquor extracted from it with methyl alcohol is concentrated and is poured into cold water to obtain light brown precipitate, which after being filtered and dried is converted into alcohol solution and then is shaken with the addition of petroleum ether. Next, ether is poured into the lower one of the two liquid layers thus produced so as to separate a resinous matter. Then, said alcohol ether solution is volatilized into alcohol solution again, which is poured into water and precipitated. Finally, it is lixiviated in a cold state with ethyl acetate and its volatilization residue is crystallized from dilute alcohol. Next, it is saponified and de-acetylized by adding alkali and then is dissolved in glacial acetic acid and is acted upon by hydrohalogenic acid while being cooled, to be converted into a new compound, desacetyl-pseudo-bufotalin haloid. Thus, it is possible to produce a far more powerful practical medicine than bufotalin.

Pseudo bufotalin of the present invention is considerably different from what is known as bufotalin. Bufotalin is hydrolyzed easily by hydrohalogenic acid to separate acetyl radical and simultaneously receives dehydrating action to separate water, so it may be regarded in its result that it separates acetic acid, the reaction being as shown below:—

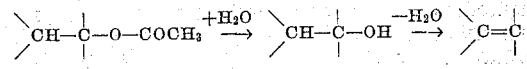

Pseudo-bufotalin not separating acetyl radical, is not hydrolyzed by hydrohalogenic acid, but if it is saponified with alkali (caustic alkali, ammonia, etc.) and acetyl radical is separated, the hydroxyl radical produced causes intermolecular inner transition and becomes stable ketoform and has no more room for effecting dehydrating reaction. The reaction is as follows:—

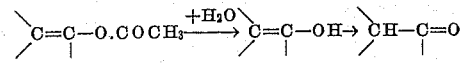

The following is an example of carrying out the present invention in practice.

Pulverize 300 grams of the Chinese medicine, "Sénso" and lixiviate it several times with methyl alcohol at a temperature not above 40° C. Collect the liquor extracted and concentrate it in a water bath below 40° C. under reduced pressure. Pour it into water, polishing it in a mortar and leave it alone for one day and night, and then light brown precipitate will be obtained. After filtering it and nearly drying it on an unglazed porcelain plate, dry it under vacuum in a calcium chloride desiccator, and 68 grams of the yield (about 22% of the material) will be obtained.

Dissolve 50 grams of the above crude product in a hot state in 50 c. c. of absolute alcohol and after being cooled, shake is sufficiently with the addition of petroleum ether to dissolve fat, cholesterin, etc. and separate the upper layer (petroleum ether layer). Next, after adding ether to the lower layer to remove out a resinous matter, distil said ether alcohol solution under reduced pressure. Dissolve the residue again in hot alcohol and cool it. Then, pour it into iced water, shaking it sufficiently and produce the precipitate, rubbing the wall of the vessel with a glass stick, and 35 grams of slightly flesh-colored powder (about 11% of the material) will be obtained.

Next, if the above refined powder is lixiviated in a cold state with ethyl acetate and is crystallized out from dilute alcohol after removing the solution by distillation, 25 grams (about 8% of the material) of fine white crystal of pseudo-bufotalin will be obtained. It contracts at 107° C. and has the melting point of 145–146° C. at which it produces bubbles. The result of its analysis shows that it agrees with $C_{26}H_{36}O_6$.

Dissolve 10 grams of pseudo-bufotalin thus obtained in 600 c. c. (about 6 or 7 times greater than the calculated quantity) of ½ normal alcoholic potassium hydroxide solution (1,500 c. c. if ⅕ normal solution) and boil it on a water bath for nearly one hour for saponification. Next, concentrate it under reduced pressure and add acetic acid and then crystallize out the reacted product or reversely after acidifying it with acetic acid, concentrate it under reduced pressure to crystallize out reacted product, after which it is extracted with ethylacetate. Dissolve the residue obtained by volatilizing the above extracted liquor, in dilute alcohol and crystallize it, and then about 7 grams (74% of the theoretical number) of desacetyl pseudo-bufotalic acid ($C_{24}H_{36}O_6$) will be obtained. Said substance thus obtained has a white color and, if dried at a low temperature, contracts at 95° C. and shows the melting point of 130° C. (does not produce bubbles). It is also soluble in alkali carbonate and can be easily methylated by diazomethane. However, if heated or left long in a vacuum drying apparatus, this substance gradually causes lactone closed chains and becomes insoluble in alkali carbonate till it produces desacetyl pseudo-bufotalin $$(C_{24}H_{34}O_5)$$

Dissolve 7.5 grams of the above desacetyl-pseudo-bufotalin in 500 c. c. of glacial acetic acid and saturate it with hydrochloric acid gas by passing the latter upon it, while cooling it at about 0° C. When its contents have gradually shown a dark purple color, leave it for one or two days and nights at room temperature (about 20° C.) and subject it to distillation under reduced pressure to remove excesses of hydrochloric acid gas and glacial acetic acid. Then, add water, and non-crystallizable light yellow precipitate will be produced. Next, suck and filter it, and after being dried on an unglazed porcelain plate, lixiviate it in a cold state with ethyl acetate. Then, dissolve in dilute alcohol the residue obtained by distilling the above extracted liquor and crystallize it out, and about 6 grams (77–80% of the theoretical number) of desacetyl-pseudo-bufotalin chloride will be obtained.

The substance thus obtained has a light yellow color with the decomposing point of 140–145° C. The result of its analysis shows that it agrees with $C_{24}H_{33}O_4Cl$. Also, its acetyl compound shows a decomposing point of 160–165° C. and has the medical effect several times greater than pseudo-bufotalin. In fact, it has been ascertained that even $5 \times 10^9$ times solution still has the power of stimulating the action of the heart and that it is rather less poisonous.

We claim:

1. Method of preparing pseudo-bufotalin haloid, which consists in dissolving the dried venom secretion obtained from Chinese toads in alcohol, adding petroleum either thereto and shaking the solution, removing the petroleum ether separated as the upper layer and further adding ether to the alcoholic solution which forms the lower layer, taking away the resinous matter thus separated, vaporizing the alcohol-ether solution, dissolving the residue in alcohol and pouring it into water, and precipitating it, dissolving the thus-separated precipitate in a cold state with ethyl acetate, vaporizing the solution, again dissolving the residue in alcohol and crystallizing out pseudo-bufotalin, then dissolving the same in glacial acid and causing dry hydro-halogenic acid to act upon it while cooling it, and finally removing the remaining hydro-halogenic acid and acetic acid.

2. Desacetyl bufotalin prepared by combining pseudo-bufotalin obtained from the dried venom secretion of Chinese toads with hydrohalogenic acid and thus converting the same to the form of $C_{24}H_{33}O_4X (X=halogen)$.

HEIZABURO KONDO.
SHUNICHI IKAWA.
YOSHITO KOBAYASHI.